(12) United States Patent
Smith et al.

(10) Patent No.: US 9,715,597 B2
(45) Date of Patent: Jul. 25, 2017

(54) DATA VERIFICATION USING ENCLAVE ATTESTATION

(71) Applicant: McAfee, Inc., Santa Clara, CA (US)

(72) Inventors: Ned Smith, Beaverton, OR (US);
Esteban Gutierrez, Portland, OR (US);
Andrew Woodruff, Portland, OR (US);
Aditya Kapoor, Portland, OR (US)

(73) Assignee: McAfee, Inc., Santa Clara, CA (US)

( * ) Notice: Subject to any disclaimer, the term of this patent is extended or adjusted under 35 U.S.C. 154(b) by 0 days.

(21) Appl. No.: 14/496,056

(22) Filed: Sep. 25, 2014

(65) Prior Publication Data
US 2016/0092700 A1    Mar. 31, 2016

(51) Int. Cl.
| | |
|---|---|
| H04L 29/06 | (2006.01) |
| G06F 21/64 | (2013.01) |
| G06F 21/56 | (2013.01) |
| G06F 21/62 | (2013.01) |

(52) U.S. Cl.
CPC ............ *G06F 21/64* (2013.01); *G06F 21/566* (2013.01); *G06F 21/6281* (2013.01); *G06F 2221/032* (2013.01); *G06F 2221/2115* (2013.01)

(58) Field of Classification Search
CPC .......................... H04L 63/123; H04L 9/3244
USPC ........................................................ 713/161
See application file for complete search history.

(56) References Cited

U.S. PATENT DOCUMENTS

| | | | |
|---|---|---|---|
| 5,987,610 A | 11/1999 | Franczek et al. | |
| 6,073,142 A | 6/2000 | Geiger et al. | |
| 6,460,050 B1 | 10/2002 | Pace et al. | |
| 7,506,155 B1 | 3/2009 | Stewart et al. | |
| 2008/0077994 A1 | 3/2008 | Comlekoglu | |
| 2010/0005291 A1* | 1/2010 | Hulten ..................... G06F 21/51 713/156 |
| 2011/0047613 A1* | 2/2011 | Walsh ...................... G06F 21/53 726/16 |
| 2011/0099609 A1* | 4/2011 | Malhotra .............. G06F 21/566 726/4 |
| 2013/0097424 A1 | 4/2013 | Simon et al. | |
| 2013/0198853 A1 | 8/2013 | McKeen et al. | |
| 2014/0090083 A1* | 3/2014 | Kobayashi .............. G06F 21/10 726/27 |

(Continued)

FOREIGN PATENT DOCUMENTS

| | | |
|---|---|---|
| WO | WO 2012/087562 A2 | 6/2012 |
| WO | WO 2016/048532 A1 | 3/2016 |

OTHER PUBLICATIONS

International Search Report and Written Opinion in International Application No. PCT/US2015/046798, mailed on Feb. 19, 2016, 11 pages.

*Primary Examiner* — Teshome Hailu
(74) *Attorney, Agent, or Firm* — Patent Capital Group

(57) ABSTRACT

Particular embodiments described herein provide for an electronic device that can be configured to receive untrusted input data at an enclave in an electronic device, isolate the untrusted input data from at least a portion of the enclave, communicate at least a portion of the untrusted data to an integrity verification module using an attestation channel, and receive data integrity verification of the untrusted input data from the integrity verification module. The integrity verification module can perform data integrity attestation functions to verify the untrusted data and the data integrity attestation functions include a data attestation policy and a whitelist.

18 Claims, 8 Drawing Sheets

(56) References Cited

U.S. PATENT DOCUMENTS

| | | | |
|---|---|---|---|
| 2014/0096241 A1* | 4/2014 | Li | H04L 63/12 726/22 |
| 2014/0181530 A1* | 6/2014 | Kononov | G06F 21/577 713/187 |
| 2014/0258733 A1 | 9/2014 | Scott-Nash | |

* cited by examiner

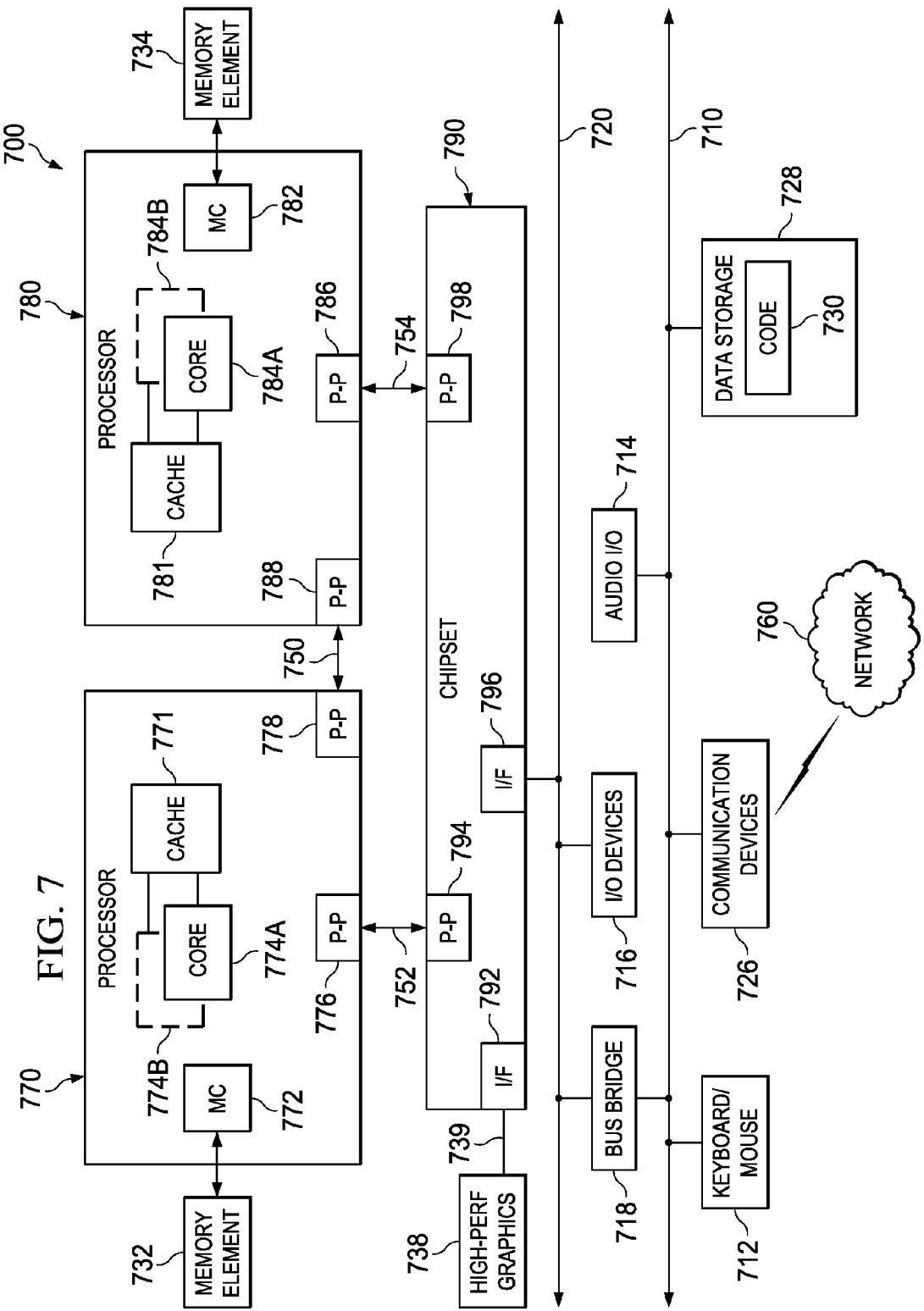

DATA VERIFICATION USING ENCLAVE ATTESTATION

TECHNICAL FIELD

This disclosure relates in general to the field of information security, and more particularly, to data verification using enclave attestation.

BACKGROUND

The field of network security has become increasingly important in today's society. The Internet has enabled interconnection of different computer networks all over the world. In particular, the Internet provides a medium for exchanging data between different users connected to different computer networks via various types of client devices. While the use of the Internet has transformed business and personal communications, it has also been used as a vehicle for malicious operators to gain unauthorized access to computers and computer networks and for intentional or inadvertent disclosure of sensitive information.

Malicious software ("malware") that infects a host computer may be able to perform any number of malicious actions, such as stealing sensitive information from a business or individual associated with the host computer, propagating to other host computers, and/or assisting with distributed denial of service attacks, sending out spam or malicious emails from the host computer, etc. Hence, significant administrative challenges remain for protecting computers and computer networks from malicious and inadvertent exploitation by malicious software.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIG. 7 is a block diagram illustrating an example computing system that is arranged in a point-to-point configuration in accordance with an embodiment;

The FIGURES of the drawings are not necessarily drawn to scale, as their dimensions can be varied considerably without departing from the scope of the present disclosure.

DETAILED DESCRIPTION OF EXAMPLE EMBODIMENTS

Example Embodiments

Figure 1:
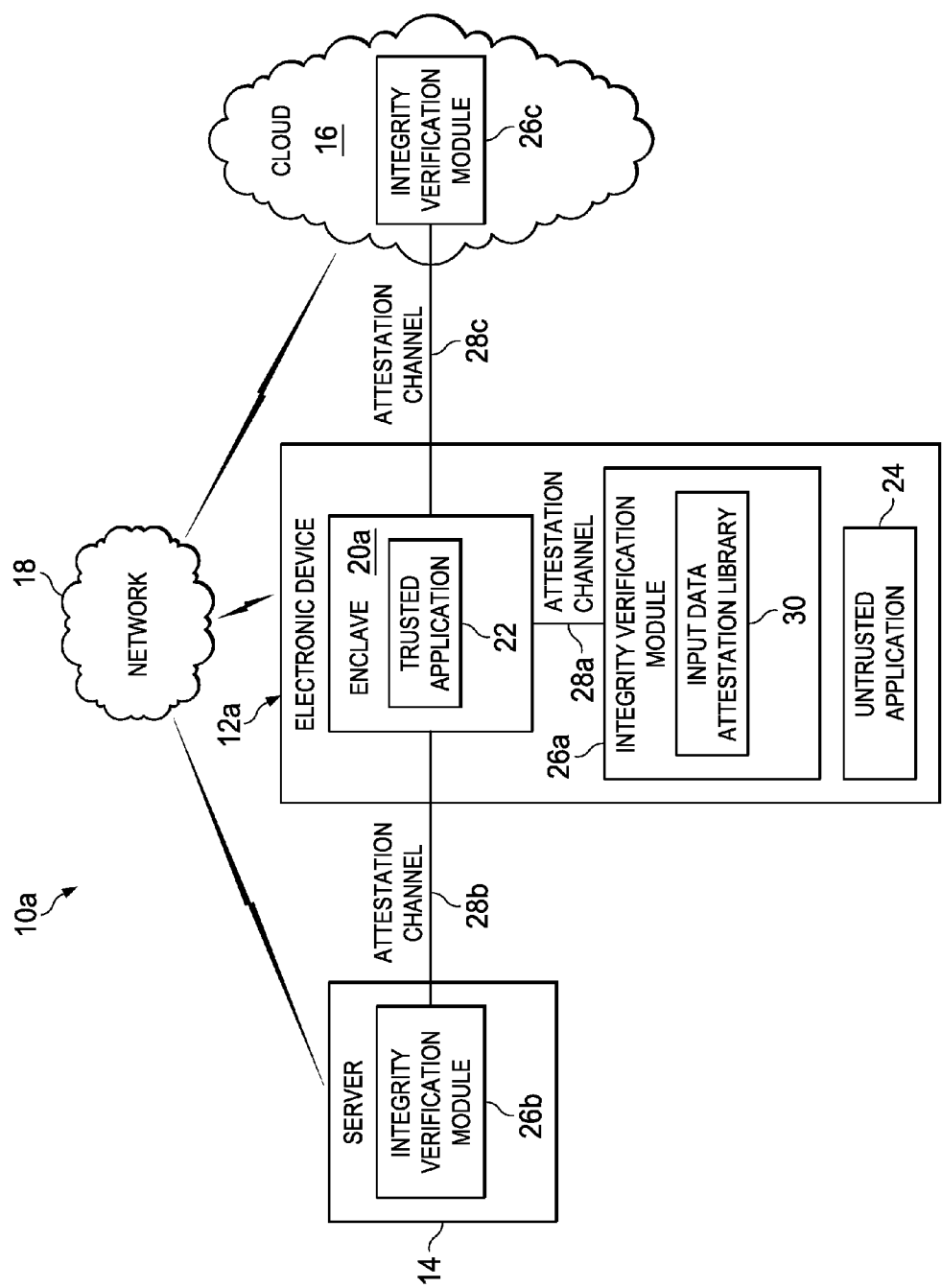
FIG. 1 is a simplified block diagram of a communication system for data verification using enclave attestation in accordance with an embodiment of the present disclosure.

FIG. 1 is a simplified block diagram of a communication system for data verification using enclave attestation in accordance with an embodiment of the present disclosure. Communication system 10a can include an electronic device 12a, a server 14, and a cloud 16. Electronic device 12a can include an enclave 20a, an untrusted application 24, and an integrity verification module 26a. Enclave 20a can include a trusted application 22. Integrity verification module 26a can include an input data attestation library 30. Enclave 20a can be coupled to integrity verification module 26a using an attestation channel 28a. Server 14 can include an integrity verification module 26b. Enclave 20a can be coupled to integrity verification module 26b in server 14 using an attestation channel 28b. Cloud 16 can include can include an integrity verification module 26c. Enclave 20a can be coupled to integrity verification module 26c in cloud 16 using an attestation channel 28c. Enclave 20a can be a trusted execution environment (TEE). Attestation channels can 28a, 28b, and 28c can be secure communication channels.

In example embodiments, communication system 10a (and 10b discussed below) can be configured to include a system to provide data verification using enclave attestation and to perform attestation of data input values to an enclave. A remote enclave verification server can apply a data integrity policy that can be updated dynamically to continually monitor attacks on input data. Communication system 10a (and 10b) can use an attestation channel to perform data integrity attestation functions and to provision a data integrity attestation policy where the policy is accessible to the enclave. Untrusted input data (e.g., data from untrusted application 24) can be isolated prior to use by the enclave application (e.g., trusted application 22) and a data integrity verification can be performed either locally using a local integrity verification module or remotely using a remote integrity verification module. Integrity verification module can be configured to use a library that can enable data range checks, data type checks, data scans for embedded code or other malware, etc.

Elements of FIG. 1 may be coupled to one another through one or more interfaces employing any suitable connections (wired or wireless), which provide viable pathways for network (e.g., network 18) communications. Additionally, any one or more of these elements of FIG. 1 may be combined or removed from the architecture based on particular configuration needs. Communication system 10a (and 10b) may include a configuration capable of transmission control protocol/Internet protocol (TCP/IP) communications for the transmission or reception of packets in a network. Communication system 10a (and 10b) may also operate in conjunction with a user datagram protocol/IP (UDP/IP) or any other suitable protocol where appropriate and based on particular needs.

For purposes of illustrating certain example techniques of communication system 10a (and 10b), it is important to understand the communications that may be traversing the network environment. The following foundational information may be viewed as a basis from which the present disclosure may be properly explained. The term "enclave" is inclusive of a trusted execution environment (TEE) and is a protected region of memory that is typically only accessible by the enclave itself or through a trusted services application program interface. Generally, other processes cannot read, write, or otherwise access the data stored in the enclave and the enclave allows a trusted application to be protected during execution.

In current systems, an untrusted loader can install code into the enclave and enclave contents (e.g., loaded code) can be verified remotely using attestation. The remote verifier must have a whitelist with which to evaluate the trustworthiness of the code and assign an attestation value. However, the enclave may still be vulnerable to attack during execution when data input to the enclave is used to exploit code weaknesses or to compromise the integrity of the enclave protected data. The enclave designers anticipated the potential for untrusted data input sources by enabling the enclave to use an enclave specific key that may be used to establish a secure communications channel to an input source. Typically, an out-of-band method is required to establish trust in the input source. However, it is still possible for the input source to be rogue because in practice, enclaves are deployed in heterogeneous environments containing a mix of enclave aware and enclave ignorant systems. What is needed is a system and method of data integrity verification using an enclave attestation and a secure attestation communication channel.

A communication system for data verification using enclave attestation, as outlined in FIG. 1, can resolve these issues (and others). In communication system 10a of FIG. 1, to perform data verification using enclave attestation, the system can be configured to include an integrity verification module (e.g., integrity verification module 26a, 26b, or 26c) and APIs and logic for instrumenting an enclave application with input data attestation services. The integrity verification module can use a TEE channel for initial attestation where input data may be given to a server (e.g., server 14) or cloud services (e.g., cloud 16) for analysis. Application specific or domain specific policies may be used by the server or cloud services as part of the analysis. Alternatively, the policy, or a portion of the policy, may be provisioned to a local integrity verification module where input data integrity and range checking can be performed locally within the enclave.

Input data instrumentation can be application specific. For example, an application may expect input values that are only even numbers. The data attestation policy may specify this constraint, or other similarly application specific constraints. Input data checking can be more generic as well. For example, a data attestation policy may require input data to be within the range of a 32-bit or 64-bit integer. Input data checking may also involve sophisticated analysis designed to detect code blocks disguised as data. For example, a simple java script application may be encoded as an input string such as a person's name or place of residence. The integrity verification module can analyze the string for patterns, characteristic of code, scripts, etc. In examples where it would be more efficient to process data integrity checks on the electronic device, the data attestation policy may be provisioned over the attestation channel to the electronic device. Local processing may occur and the result of the processing may be reported back over the attestation channel.

Enclave applications can anticipate that enclaves will only connect to trusted input sources using an encrypted channel or a dedicated out-of-band channel. Communication system 10a can allow untrusted input to occur without compromising the integrity of enclave code. For example, enclave applications may be written to perform local or remote range checking and other data integrity checks. In addition, an electronic device can use an attestation channel to perform data integrity checks on a remote server or cloud, to perform integrity checks on a local enclave using a dynamically provisioned policy. Also, results of local integrity checks can be reported over the attestation channel. Static analysis of the enclave application can establish whether or not the input data libraries are being used. Normal attestation establishes that an un-tampered application is loaded into the enclave. Code path instrumentation can be used by an integrity verification service (e.g., integrity verification module 26a, 26b or 26c) to assist in construction of a policy that may be used to focus input data verification checking.

In an example implementation, an untrusted application (e.g., untrusted application 24) inputs untrusted data to an enclave application. The untrusted data may exceed buffer size limits, violate data typing rules, may contain attack code, etc. A trusted application (e.g., trusted application 22) in the enclave that includes or has access to an input data attestation library intercepts the untrusted data before other parts of the enclave may access it. The untrusted data is forwarded to an integrity verification module using an attestation channel where data integrity analysis checks can be performed. The data integrity analysis checks can include, but are not limited to, data range and type checking, data values checking, and data content scanning that may include scans for embedded code or script. If the untrusted data is verified, the verified (and possibly sanitized) data is returned to the enclave for processing.

In an embodiment, a verification policy can be provisioned to the enclave application that includes or has access to the data attestation library where some or all of the data integrity verifications can be applied. The policy may be provisioned using the attestation channel. The verification results may be communicated to a server or cloud services where an auditing check can be performed and the results logged for analyses.

Turning to the infrastructure of FIG. 1, communication system 10a (and 10b) in accordance with an example embodiment is shown. Generally, communication system 10a (and 10b) can be implemented in any type or topology of networks. Network 18 represents a series of points or nodes of interconnected communication paths for receiving and transmitting packets of information that propagate through communication system 10a (and 10b). Network 18 offers a communicative interface between nodes, and may be configured as any local area network (LAN), virtual local area network (VLAN), wide area network (WAN), wireless local area network (WLAN), metropolitan area network (MAN), Intranet, Extranet, virtual private network (VPN), and any other appropriate architecture or system that facilitates communications in a network environment, or any suitable combination thereof, including wired and/or wireless communication.

In communication system 10a (and 10b), network traffic, which is inclusive of packets, frames, signals, data, etc., can be sent and received according to any suitable communication messaging protocols. Suitable communication messaging protocols can include a multi-layered scheme such as Open Systems Interconnection (OSI) model, or any derivations or variants thereof (e.g., Transmission Control Protocol/Internet Protocol (TCP/IP), user datagram protocol/IP (UDP/IP)). Additionally, radio signal communications over a cellular network may also be provided in communication system 10*a* (and 10*b*). Suitable interfaces and infrastructure may be provided to enable communication with the cellular network.

The term "packet" as used herein, refers to a unit of data that can be routed between a source node and a destination node on a packet switched network. A packet includes a source network address and a destination network address. These network addresses can be Internet Protocol (IP) addresses in a TCP/IP messaging protocol. The term "data" as used herein, refers to any type of binary, numeric, voice, video, textual, or script data, or any type of source or object code, or any other suitable information in any appropriate format that may be communicated from one point to another in electronic devices and/or networks. Additionally, messages, requests, responses, and queries are forms of network traffic, and therefore, may comprise packets, frames, signals, data, etc.

In an example implementation, electronic device 12*a*, server 14, and cloud 16 are network elements, which are meant to encompass network appliances, servers, routers, switches, gateways, bridges, load balancers, processors, modules, or any other suitable device, component, element, or object operable to exchange information in a network environment. Network elements may include any suitable hardware, software, components, modules, or objects that facilitate the operations thereof, as well as suitable interfaces for receiving, transmitting, and/or otherwise communicating data or information in a network environment. This may be inclusive of appropriate algorithms and communication protocols that allow for the effective exchange of data or information.

In regards to the internal structure associated with communication system 10*a* (and 10*b*), each of electronic device 12*a*, server 14, and cloud 16 can include memory elements for storing information to be used in the operations outlined herein. Each of electronic device 12*a*, server 14, and cloud 16 may keep information in any suitable memory element (e.g., random access memory (RAM), read-only memory (ROM), erasable programmable ROM (EPROM), electrically erasable programmable ROM (EEPROM), application specific integrated circuit (ASIC), etc.), software, hardware, firmware, or in any other suitable component, device, element, or object where appropriate and based on particular needs. Any of the memory items discussed herein should be construed as being encompassed within the broad term 'memory element.' Moreover, the information being used, tracked, sent, or received in communication system 10*a* (and 10*b*) could be provided in any database, register, queue, table, cache, control list, or other storage structure, all of which can be referenced at any suitable timeframe. Any such storage options may also be included within the broad term 'memory element' as used herein.

In certain example implementations, the functions outlined herein may be implemented by logic encoded in one or more tangible media (e.g., embedded logic provided in an ASIC, digital signal processor (DSP) instructions, software (potentially inclusive of object code and source code) to be executed by a processor, or other similar machine, etc.), which may be inclusive of non-transitory computer-readable media. In some of these instances, memory elements can store data used for the operations described herein. This includes the memory elements being able to store software, logic, code, or processor instructions that are executed to carry out the activities described herein.

In an example implementation, network elements of communication system 10*a* (and 10*b*), such as electronic device 12*a*, server 14, and cloud 16 may include software modules (e.g., integrity verification modules 26*a*, 26*b*, and 26*c* respectively) to achieve, or to foster, operations as outlined herein. These modules may be suitably combined in any appropriate manner, which may be based on particular configuration and/or provisioning needs. In example embodiments, such operations may be carried out by hardware, implemented externally to these elements, or included in some other network device to achieve the intended functionality. Furthermore, the modules can be implemented as software, hardware, firmware, or any suitable combination thereof. These elements may also include software (or reciprocating software) that can coordinate with other network elements in order to achieve the operations, as outlined herein.

Additionally, each of electronic device 12*a*, server 14, and cloud 16 may include a processor that can execute software or an algorithm to perform activities as discussed herein. A processor can execute any type of instructions associated with the data to achieve the operations detailed herein. In one example, the processors could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an EPROM, an EEPROM) or an ASIC that includes digital logic, software, code, electronic instructions, or any suitable combination thereof. Any of the potential processing elements, modules, and machines described herein should be construed as being encompassed within the broad term 'processor.'

Electronic device 12*a* can be a network element and includes, for example, desktop computers, laptop computers, mobile devices, personal digital assistants, smartphones, tablets, or other similar devices. Security server 14 can be a network element such as a server or virtual server and can be associated with clients, customers, endpoints, or end users wishing to initiate a communication in communication system 10*a* (and 10*b*) via some network (e.g., network 18). The term 'server' is inclusive of devices used to serve the requests of clients and/or perform some computational task on behalf of clients within communication system 10*a* (and 10*b*). Although integrity verification modules 26*a*, 26*b*, and 26*c* are represented in FIG. 1 as being located in electronic device 12*a*, security server 14, and cloud 16 respectively this is for illustrative purposes only. Integrity verification modules 26*a*, 26*b*, and 26*c* could be combined or separated in any suitable configuration. Furthermore, integrity verification modules 26*a*, 26*b*, and 26*c* could be integrated with or distributed in another network accessible by electronic device 12*a*. Cloud 16 is configured to provide cloud services to electronic device 12*a*. Cloud services may generally be defined as the use of computing resources that are delivered as a service over a network, such as the Internet. Typically, compute, storage, and network resources are offered in a cloud infrastructure, effectively shifting the workload from a local network to the cloud network.

Figure 2:
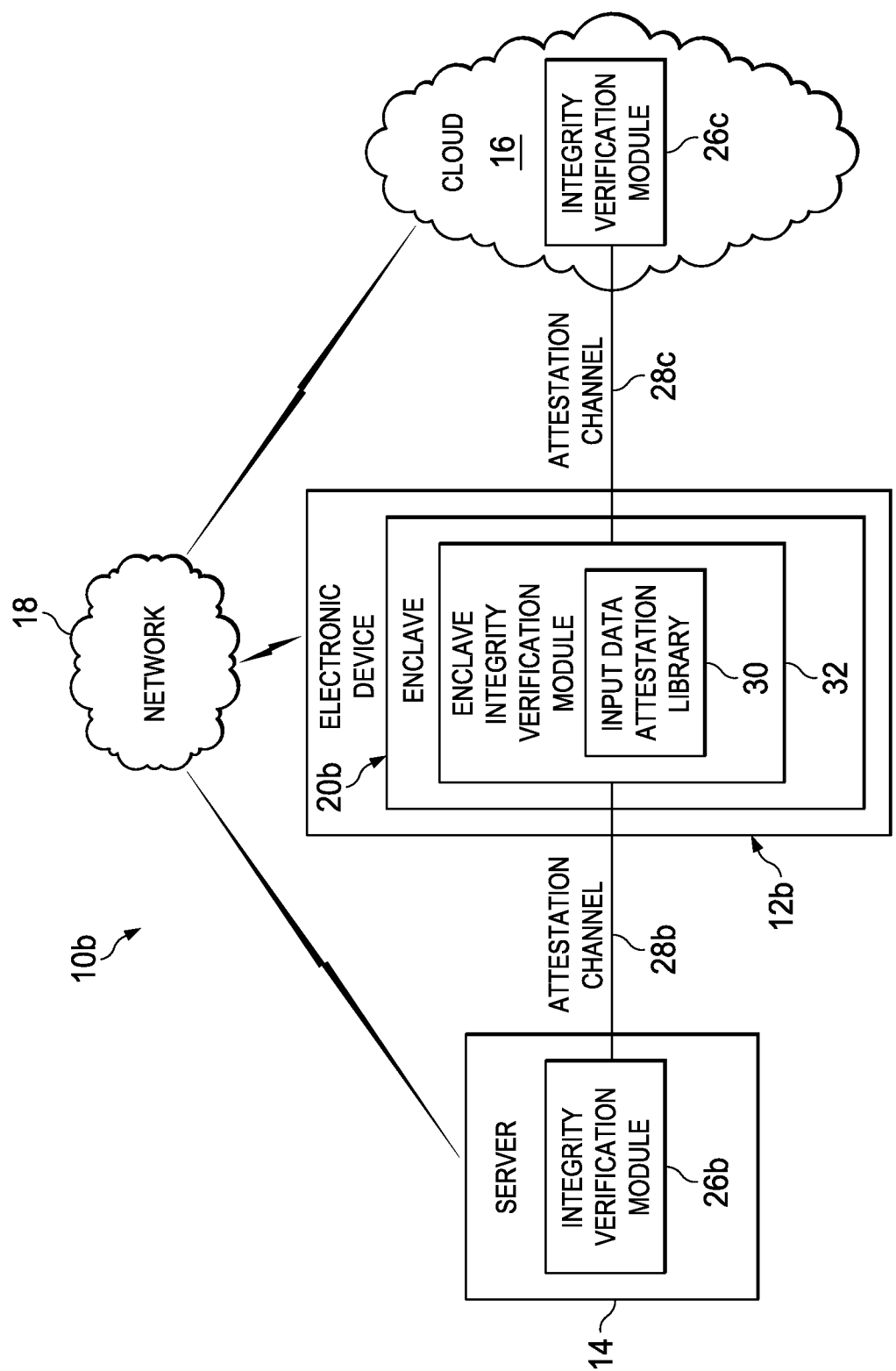
FIG. 2 is a simplified block diagram of a portion of a communication system for data verification using enclave attestation in accordance with an embodiment of the present disclosure.

Turning to FIG. 2, FIG. 2 is a simplified block diagram of a communication system 10*b* for data verification using enclave attestation in accordance with an embodiment of the present disclosure. Communication system 10*b* can include an electronic device 12*b*. Electronic device 12*b* can include an enclave 20*b*. Enclave 20*b* can include an enclave integrity verification module 32. Enclave integrity verification module 32 can include input data attestation library 30. Enclave integrity verification module 32 is similarly configured as integrity verification module 26a and allows enclave 20b to perform data verification within enclave 20b and can be thought of as an enclave within an enclave. Attestation channels 28b and 28c can be used to update input data attestation library 30 in enclave integrity verification module 32.

Figure 3:
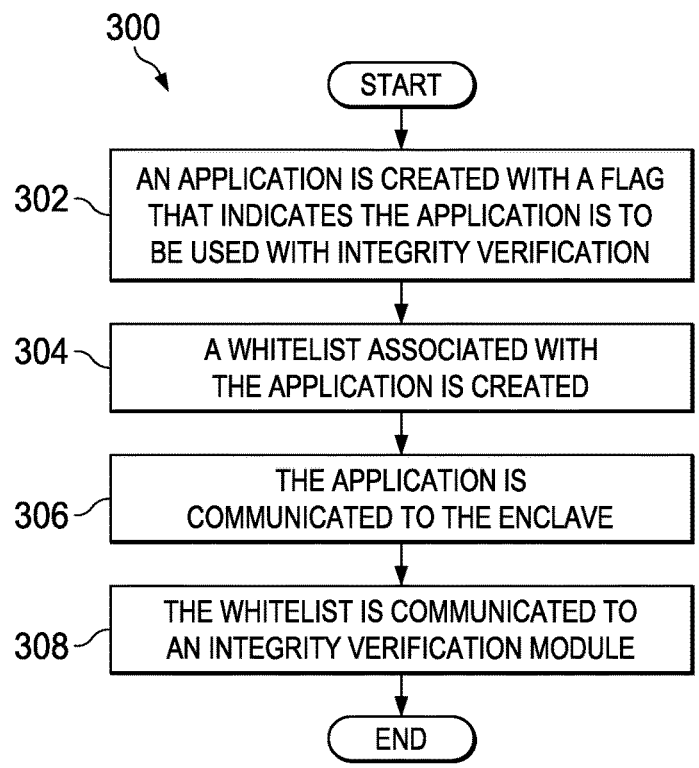
FIG. 3 is a simplified flowchart illustrating potential operations that may be associated with the communication system in accordance with an embodiment.

Turning to FIG. 3, FIG. 3 FIG. 3 is an example flowchart illustrating possible operations of a flow 300 that may be associated with data verification using enclave attestation, in accordance with an embodiment. At 302, an application is created with a flag (or some other indicator) that indicates the application is to be used with integrity verification. For example, a developer may create an application and the developer may want the application to be used with an enclave to enable integrity verification. Instead of writing the code to enable the integrity verification, the developer can just set the flag and the system will recognize that the application is to be used with integrity verification. At 304, a whitelist associated with the application is created. The whitelist can include trusted applications and processes associated with the application. At 306, the application is communicated to the enclave. At 308, the whitelist is communicated to an integrity verification module. For example, the whitelist may be stored in input data attestation library 30 and can be used for data verification. During operation, an untrusted application or service may supply untrusted data to the application. The enclave can use the attestation channel to validate the untrusted data prior to use of the untrusted data by the enclave.

Figure 4:
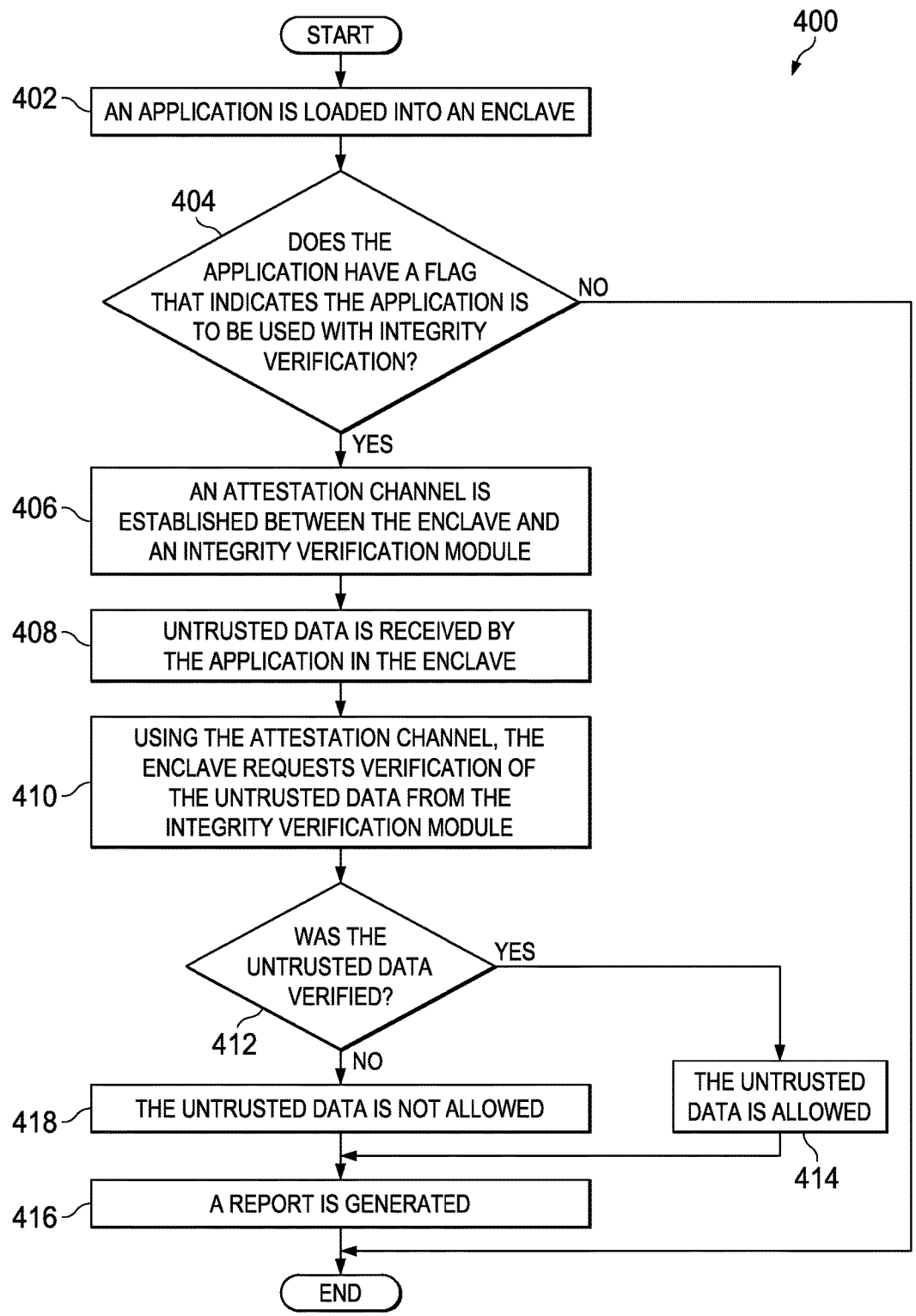
FIG. 4 is a simplified flowchart illustrating potential operations that may be associated with the communication system in accordance with an embodiment.

Turning to FIG. 4, FIG. 4 is an example flowchart illustrating possible operations of a flow 400 that may be associated with data verification using enclave attestation, in accordance with an embodiment. In an embodiment, one or more operations of flow 400 may be performed by integrity verification module 26a, 26b, 26c or enclave integrity verification module 32. At 402, an application is loaded into an enclave. At 404, the system determines if the application has a flag (or some other indicator) that indicates the application is to be used with integrity verification. If the application does not have a flag that indicates the application is to be used with integrity verification, then the process ends. If the application does have a flag that indicates the application is to be used with integrity verification, then an attestation channel is established between the enclave and an integrity verification module, as in 406. At 408, untrusted data is received by the application in the enclave. At 410, using the attestation channel, the enclave requests verification of the untrusted data from the integrity verification module. At 412, the system determines if the untrusted data is verified. If the untrusted data was verified (by the integrity verification module), then the untrusted data is allowed, as in 414. If the untrusted data was not verified (by the integrity verification module), then the untrusted data is not allowed, as in 418 and a report is generated regarding the untrusted data, as in 416.

Figure 5:
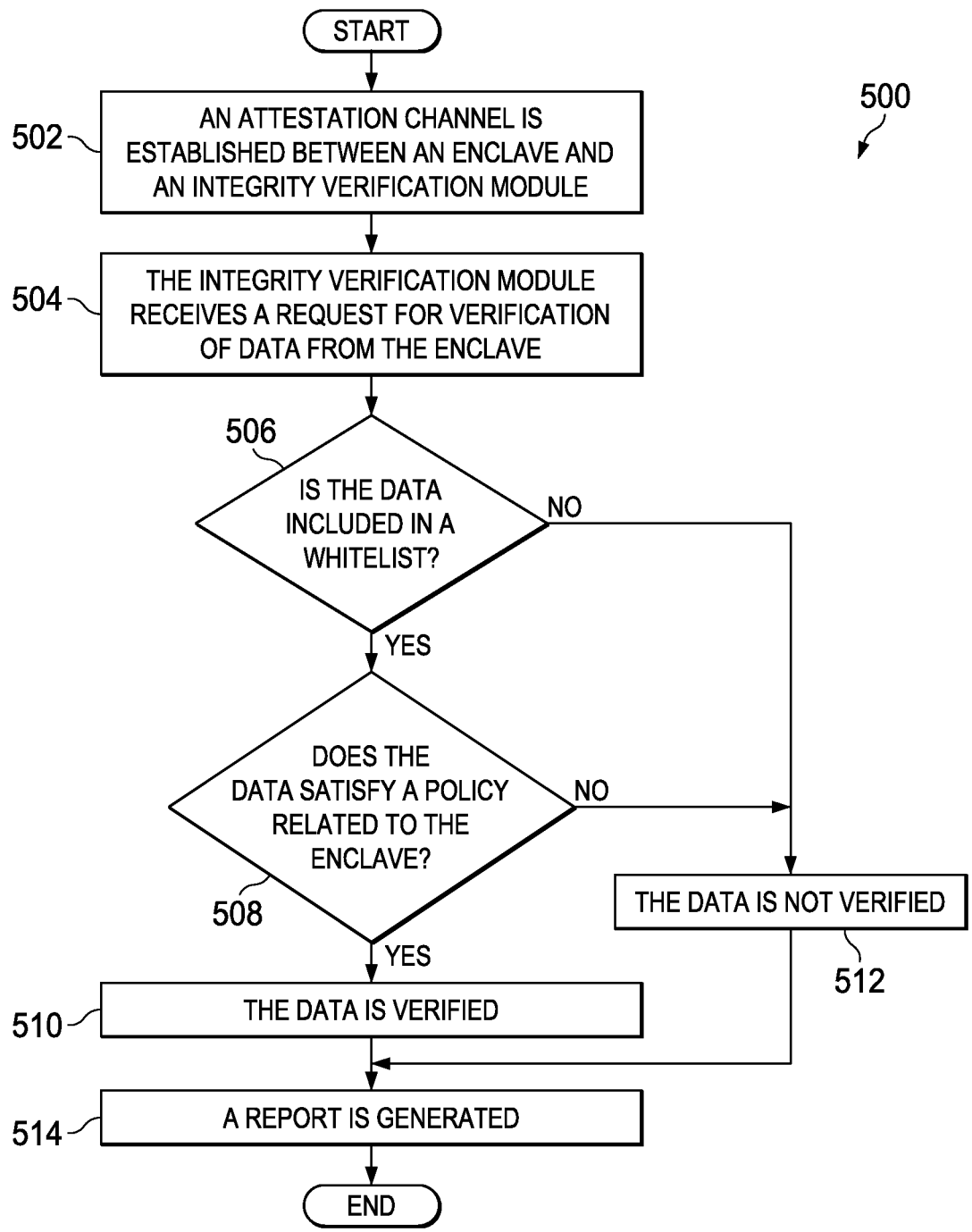
FIG. 5 is a simplified flowchart illustrating potential operations that may be associated with the communication system in accordance with an embodiment.

Turning to FIG. 5, FIG. 5 is an example flowchart illustrating possible operations of a flow 500 that may be associated with data verification using enclave attestation, in accordance with an embodiment. In an embodiment, one or more operations of flow 500 may be performed by integrity verification module 26a, 26b, 26c or enclave integrity verification module 32. At 502, an attestation channel is established between an enclave and an integrity verification module. At 504, the integrity verification module receives a request for verification of (untrusted) data from the enclave. At 506, the system determines if the data is included in a whitelist. For example, an integrity verification module may determine if the data is included in an input data attestation library. If the data is not included in the whitelist, then the data is not allowed, as in 512 and a report is generated as in 514. If the data is included in the whitelist, then the system determines if the data satisfies a policy related to the enclave, as in 508. For example, the system may determine if the data satisfies one or more data integrity analysis checks. If the data does not satisfy a policy related to the enclave, then the data is not verified, as in 512. If the data does satisfy a policy related to the enclave, then the data is verified, as in 510 and a report is generated as in 514.

Figure 6:
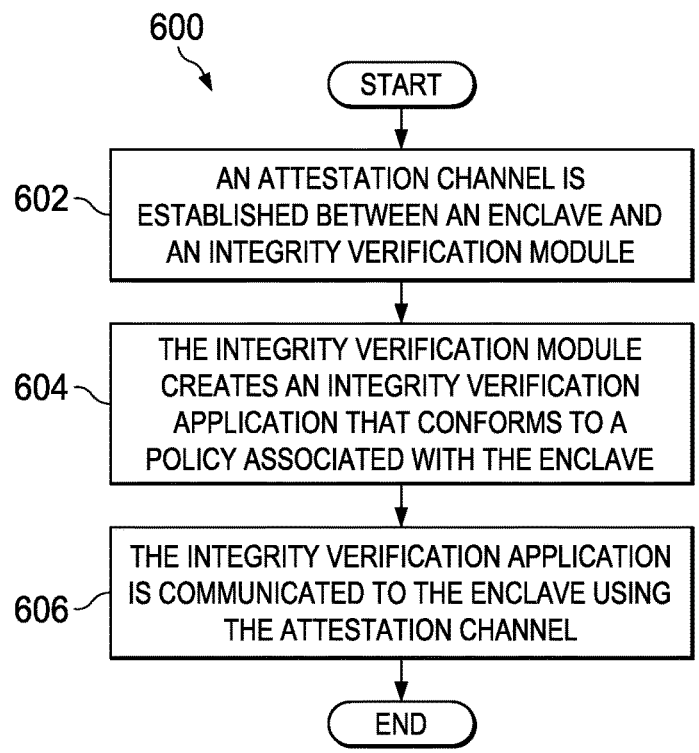
FIG. 6 is a simplified flowchart illustrating potential operations that may be associated with the communication system in accordance with an embodiment.

Turning to FIG. 6, FIG. 6 is an example flowchart illustrating possible operations of a flow 600 that may be associated with data verification using enclave attestation, in accordance with an embodiment. In an embodiment, one or more operations of flow 600 may be performed by integrity verification module 26a, 26b, 26c or enclave integrity verification module 32. At 602, an attestation channel is established between an enclave and an integrity verification module. At 604, the integrity verification module creates an integrity verification application that conforms to a policy associated with the enclave. At 606, the integrity verification application is communicated to the enclave using the attestation channel. This process allows data verification to be performed locally on an electronic device and allows the data verification to be easily updated.

FIG. 7 illustrates a computing system 700 that is arranged in a point-to-point (PtP) configuration according to an embodiment. In particular, FIG. 7 shows a system where processors, memory, and input/output devices are interconnected by a number of point-to-point interfaces. Generally, one or more of the network elements of communication system 10 may be configured in the same or similar manner as computing system 700.

As illustrated in FIG. 7, system 700 may include several processors, of which only two, processors 770 and 780, are shown for clarity. While two processors 770 and 780 are shown, it is to be understood that an embodiment of system 700 may also include only one such processor. Processors 770 and 780 may each include a set of cores (i.e., processor cores 774A and 774B and processor cores 784A and 784B) to execute multiple threads of a program. The cores may be configured to execute instruction code in a manner similar to that discussed above with reference to FIGS. 1-6. Each processor 770, 780 may include at least one shared cache 771, 781. Shared caches 771, 781 may store data (e.g., instructions) that are utilized by one or more components of processors 770, 780, such as processor cores 774 and 784.

Processors 770 and 780 may also each include integrated memory controller logic (MC) 772 and 782 to communicate with memory elements 732 and 734. Memory elements 732 and/or 734 may store various data used by processors 770 and 780. In alternative embodiments, memory controller logic 772 and 782 may be discrete logic separate from processors 770 and 780.

Processors 770 and 780 may be any type of processor and may exchange data via a point-to-point (PtP) interface 750 using point-to-point interface circuits 778 and 788, respectively. Processors 770 and 780 may each exchange data with a chipset 790 via individual point-to-point interfaces 752 and 754 using point-to-point interface circuits 776, 786, 794, and 798. Chipset 790 may also exchange data with a high-performance graphics circuit 738 via a high-performance graphics interface 739, using an interface circuit 792, which could be a PtP interface circuit. In alternative embodiments, any or all of the PtP links illustrated in FIG. 7 could be implemented as a multi-drop bus rather than a PtP link.

Chipset 790 may be in communication with a bus 720 via an interface circuit 796. Bus 720 may have one or more devices that communicate over it, such as a bus bridge 718 and I/O devices 716. Via a bus 710, bus bridge 718 may be in communication with other devices such as a keyboard/mouse 712 (or other input devices such as a touch screen, trackball, etc.), communication devices 726 (such as modems, network interface devices, or other types of communication devices that may communicate through a computer network 760), audio I/O devices 714, and/or a data storage device 728. Data storage device 728 may store code 730, which may be executed by processors 770 and/or 780. In alternative embodiments, any portions of the bus architectures could be implemented with one or more PtP links.

The computer system depicted in FIG. 7 is a schematic illustration of an embodiment of a computing system that may be utilized to implement various embodiments discussed herein. It will be appreciated that various components of the system depicted in FIG. 7 may be combined in a system-on-a-chip (SoC) architecture or in any other suitable configuration. For example, embodiments disclosed herein can be incorporated into systems including mobile devices such as smart cellular telephones, tablet computers, personal digital assistants, portable gaming devices, etc. It will be appreciated that these mobile devices may be provided with SoC architectures in at least some embodiments.

Figure 8:
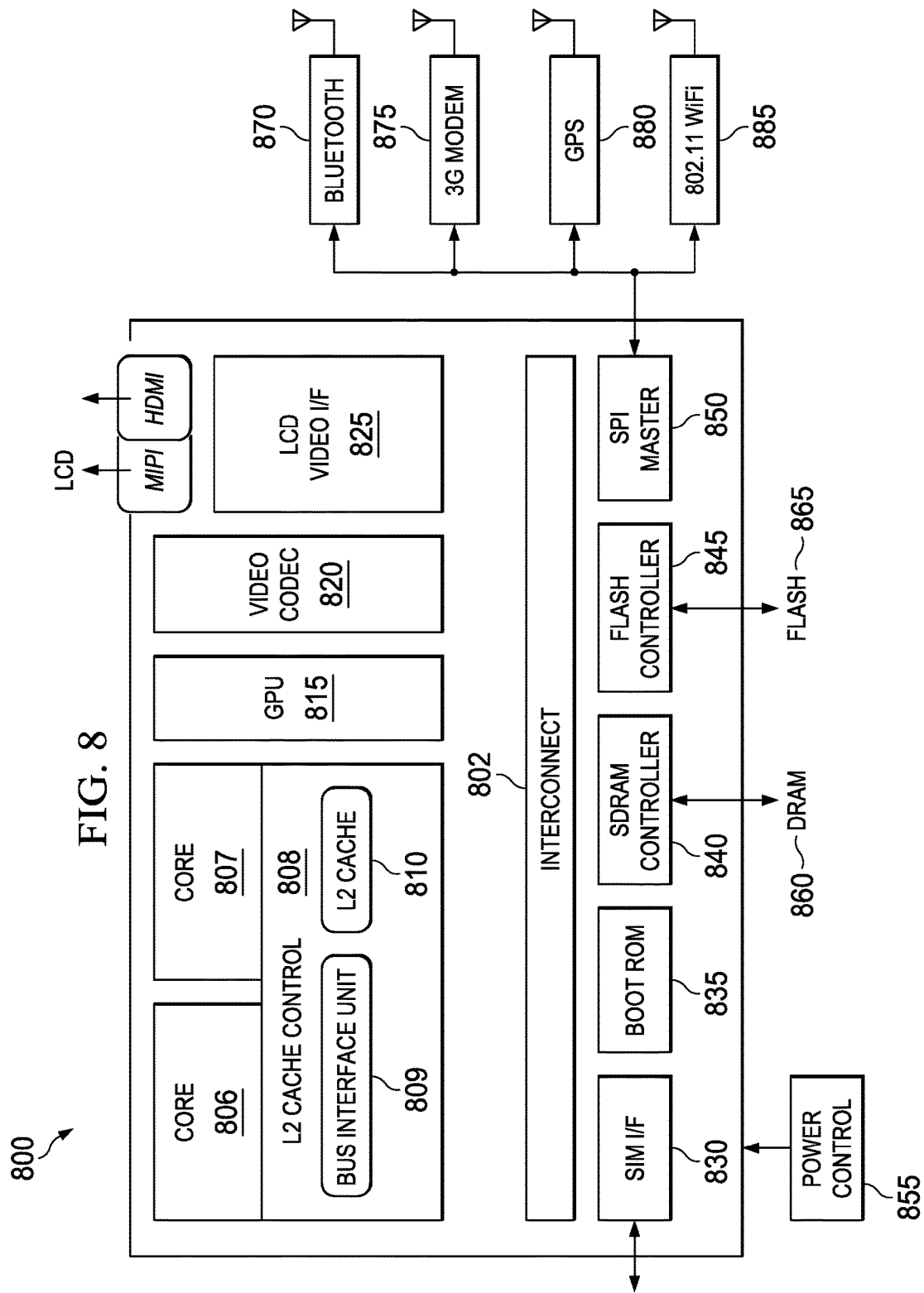
FIG. 8 is a simplified block diagram associated with an example ARM ecosystem system on chip (SOC) of the present disclosure.

Turning to FIG. 8, FIG. 8 is a simplified block diagram associated with an example ARM ecosystem SOC 800 of the present disclosure. At least one example implementation of the present disclosure can include the data verification features discussed herein and an ARM component. For example, the example of FIG. 8 can be associated with any ARM core (e.g., A-9, A-15, etc.). Further, the architecture can be part of any type of tablet, smartphone (inclusive of Android™ phones, iPhones™), iPad™, Google Nexus™, Microsoft Surface™, personal computer, server, video processing components, laptop computer (inclusive of any type of notebook), Ultrabook™ system, any type of touch-enabled input device, etc.

In this example of FIG. 8, ARM ecosystem SOC 800 may include multiple cores 806-807, an L2 cache control 808, a bus interface unit 809, an L2 cache 810, a graphics processing unit (GPU) 815, an interconnect 802, a video codec 820, and a liquid crystal display (LCD) I/F 825, which may be associated with mobile industry processor interface (MIPI)/high-definition multimedia interface (HDMI) links that couple to an LCD.

ARM ecosystem SOC 800 may also include a subscriber identity module (SIM) I/F 830, a boot read-only memory (ROM) 835, a synchronous dynamic random access memory (SDRAM) controller 840, a flash controller 845, a serial peripheral interface (SPI) master 850, a suitable power control 855, a dynamic RAM (DRAM) 860, and flash 865. In addition, one or more example embodiments include one or more communication capabilities, interfaces, and features such as instances of Bluetooth™ 870, a 3G modem 875, a global positioning system (GPS) 880, and an 802.11 Wi-Fi 885.

In operation, the example of FIG. 8 can offer processing capabilities, along with relatively low power consumption to enable computing of various types (e.g., mobile computing, high-end digital home, servers, wireless infrastructure, etc.). In addition, such an architecture can enable any number of software applications (e.g., Android™, Adobe® Flash® Player, Java Platform Standard Edition (Java SE), JavaFX, Linux, Microsoft Windows Embedded, Symbian and Ubuntu, etc.). In at least one example embodiment, the core processor may implement an out-of-order superscalar pipeline with a coupled low-latency level-2 cache.

Figure 9:
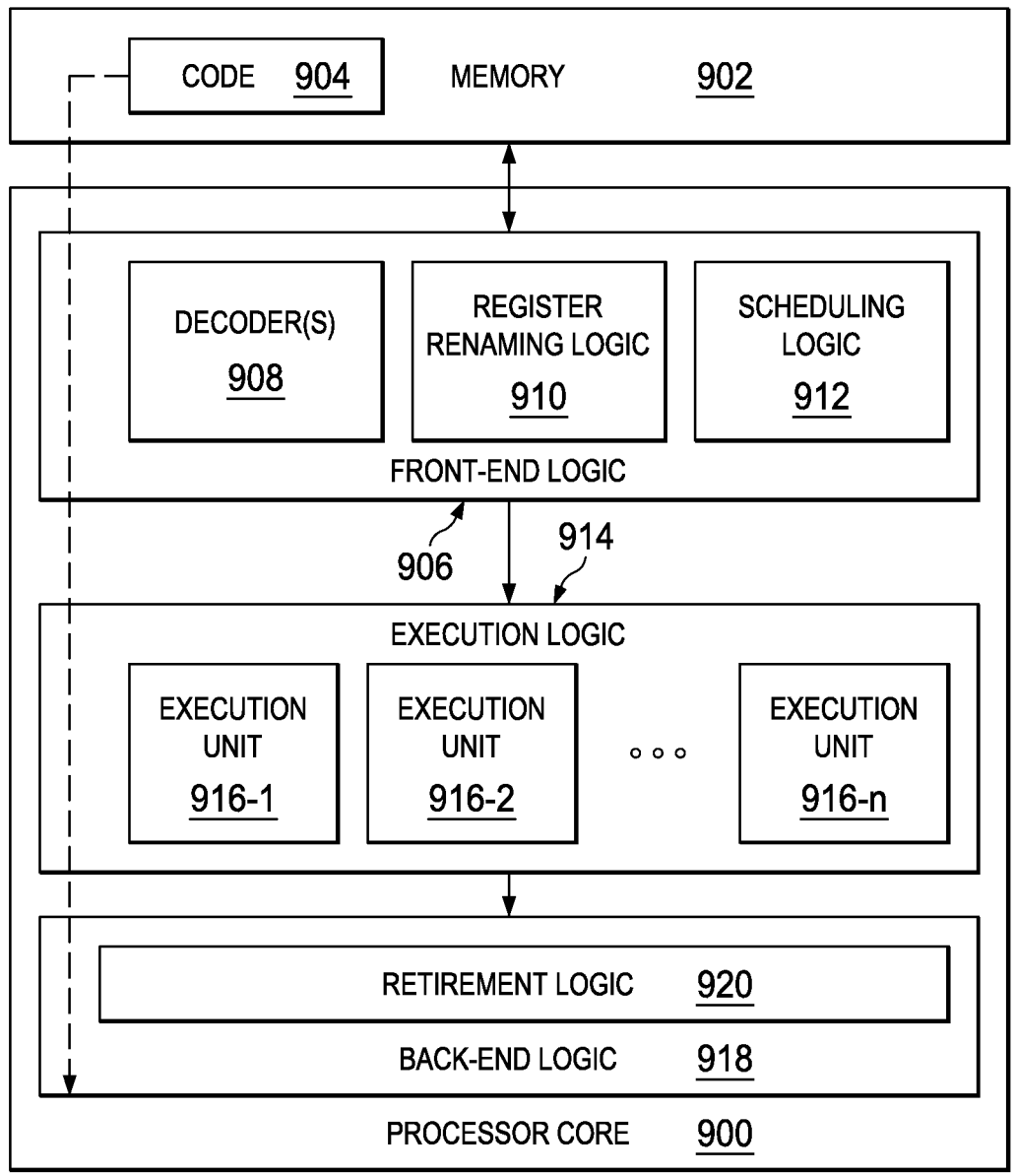
FIG. 9 is a block diagram illustrating an example processor core in accordance with an embodiment.

FIG. 9 illustrates a processor core 900 according to an embodiment. Processor core 900 may be the core for any type of processor, such as a micro-processor, an embedded processor, a digital signal processor (DSP), a network processor, or other device to execute code. Although only one processor core 900 is illustrated in FIG. 9, a processor may alternatively include more than one of the processor core 900 illustrated in FIG. 9. For example, processor core 900 represents one example embodiment of processors cores 774a, 774b, 774a, and 774b shown and described with reference to processors 770 and 780 of FIG. 7. Processor core 900 may be a single-threaded core or, for at least one embodiment, processor core 900 may be multithreaded in that it may include more than one hardware thread context (or "logical processor") per core.

FIG. 9 also illustrates a memory 902 coupled to processor core 900 in accordance with an embodiment. Memory 902 may be any of a wide variety of memories (including various layers of memory hierarchy) as are known or otherwise available to those of skill in the art. Memory 902 may include code 904, which may be one or more instructions, to be executed by processor core 900. Processor core 900 can follow a program sequence of instructions indicated by code 904. Each instruction enters a front-end logic 906 and is processed by one or more decoders 908. The decoder may generate, as its output, a micro operation such as a fixed width micro operation in a predefined format, or may generate other instructions, microinstructions, or control signals that reflect the original code instruction. Front-end logic 906 also includes register renaming logic 910 and scheduling logic 912, which generally allocate resources and queue the operation corresponding to the instruction for execution.

Processor core 900 can also include execution logic 914 having a set of execution units 916-1 through 916-N. Some embodiments may include a number of execution units dedicated to specific functions or sets of functions. Other embodiments may include only one execution unit or one execution unit that can perform a particular function. Execution logic 914 performs the operations specified by code instructions.

After completion of execution of the operations specified by the code instructions, back-end logic 918 can retire the instructions of code 904. In one embodiment, processor core 900 allows out of order execution but requires in order retirement of instructions. Retirement logic 920 may take a variety of known forms (e.g., re-order buffers or the like). In this manner, processor core 900 is transformed during execution of code 904, at least in terms of the output generated by the decoder, hardware registers and tables utilized by register renaming logic 910, and any registers (not shown) modified by execution logic 914.

Although not illustrated in FIG. 9, a processor may include other elements on a chip with processor core 900, at least some of which were shown and described herein with reference to FIG. 7. For example, as shown in FIG. 7, a processor may include memory control logic along with processor core 900. The processor may include I/O control logic and/or may include I/O control logic integrated with memory control logic.

Note that with the examples provided herein, interaction may be described in terms of two, three, or more network elements. However, this has been done for purposes of clarity and example only. In certain cases, it may be easier to describe one or more of the functionalities of a given set of flows by only referencing a limited number of network elements. It should be appreciated that communication system 10a and 10b and their teachings are readily scalable and can accommodate a large number of components, as well as more complicated/sophisticated arrangements and configurations. Accordingly, the examples provided should not limit the scope or inhibit the broad teachings of communication system 10a and 10b as potentially applied to a myriad of other architectures.

It is also important to note that the operations in the preceding flow diagrams (i.e., FIGS. 3-6) illustrate only some of the possible correlating scenarios and patterns that may be executed by, or within, communication system 10a and 10b. Some of these operations may be deleted or removed where appropriate, or these operations may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication system 10a and 10b in that any suitable arrangements, chronologies, configurations, and timing mechanisms may be provided without departing from the teachings of the present disclosure.

Although the present disclosure has been described in detail with reference to particular arrangements and configurations, these example configurations and arrangements may be changed significantly without departing from the scope of the present disclosure. Moreover, certain components may be combined, separated, eliminated, or added based on particular needs and implementations. Additionally, although communication system 10a and 10b have been illustrated with reference to particular elements and operations that facilitate the communication process, these elements and operations may be replaced by any suitable architecture, protocols, and/or processes that achieve the intended functionality of communication system 10a or 10b.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

Other Notes and Examples

Example C1 is at least one machine readable storage medium having one or more instructions that when executed by at least one processor cause the at least one processor to receive untrusted data at an enclave in an electronic device, isolate the untrusted data from at least a portion of the enclave, communicate at least a portion of the untrusted data to an integrity verification module using an attestation channel, and receive data integrity verification of the untrusted data from the integrity verification module.

In Example C2, the subject matter of Example C1 can optionally include where the integrity verification module performs data integrity attestation functions to verify the untrusted data.

In Example C3, the subject matter of any one of Examples C1-C2 can optionally include where the data integrity attestation functions include a data attestation policy.

In Example C4, the subject matter of any one of Examples C1-C3 can optionally include where the data integrity attestation functions include a whitelist.

In Example C5, the subject matter of any one of Examples C1-C4 can optionally include where the integrity verification module is located in the electronic device.

In Example C6, the subject matter of any one of Example C1-05 can optionally include where the integrity verification module is located in the enclave.

In Example C7, the subject matter of any one of Examples C1-C6 can optionally include where the integrity verification module is located in a server that is remote from the electronic device.

In Example C8, the subject matter of any one of Examples C1-C7 can optionally include where the integrity verification module is located in a cloud that is remote from the electronic device.

In Example A1, an apparatus can include an integrity verification module, where the integrity verification module is configured to receive untrusted data from an enclave in an electronic device, where the untrusted data is isolated from at least a portion of the enclave, where the untrusted data is communicated using an attestation channel, perform data integrity verification of the untrusted input data, and return the results of the data integrity verification to the enclave.

In Example, A2, the subject matter of Example A1 can optionally include where the integrity verification module is further configured to perform data integrity attestation functions to verify the untrusted data.

In Example A3, the subject matter of any one of Examples A1-A2 can optionally include where the data integrity attestation functions include a data attestation policy.

In Example A4, the subject matter of any one of Examples A1-A3 can optionally include where the data integrity attestation functions include a whitelist.

In Example A5, the subject matter of any one of Examples A1-A4 can optionally include where the integrity verification module is located in the electronic device.

In Example A6, the subject matter of any one of Examples A1-A5 can optionally include where the integrity verification module is located in the enclave.

In Example A7, the subject matter of any one of Examples A1-A6 can optionally include where the integrity verification module is located in a server that is remote from the electronic device.

In Example A8, the subject matter of any one of Examples A1-A7 can optionally include where the integrity verification module is located in a cloud that is remote from the electronic device.

Example M1 is a method including receiving untrusted input data at an enclave in an electronic device, isolating the untrusted input data from at least a portion of the enclave, communicating at least a portion of the untrusted data to an integrity verification module using an attestation channel, and receiving data integrity verification of the untrusted input data from the integrity verification module.

In Example M2, the subject matter of Example M1 can optionally include where the integrity verification module performs data integrity attestation functions to verify the untrusted data.

In Example M3, the subject matter of any one of the Examples M1-M2 can optionally include where the data integrity attestation functions include a data attestation policy.

In Example M4, the subject matter of any one of the Examples M1-M3 can optionally include where the data integrity attestation functions include a whitelist.

In Example M5, the subject matter of any one of the Examples M1-M4 can optionally include where the integrity verification module is located in the electronic device.

In Example M6, the subject matter of any one of the Examples M1-M5 can optionally include where the integrity verification module is located in a server that is remote from the electronic device.

In Example M7, the subject matter of any one of the Examples M1-M6 can optionally include where the integrity verification module is located in a cloud that is remote from the electronic device.

Example S1 is a system for data verification using enclave attestation, the system including an integrity verification module configured for receiving untrusted input data at an enclave in an electronic device, isolating the untrusted input data from at least a portion of the enclave, communicating at least a portion of the untrusted data to an integrity verification module using an attestation channel, and receiving data integrity verification of the untrusted input data from the integrity verification module.

In Example S2, the subject matter of Example S1 can optionally include where the integrity verification module performs data integrity attestation functions to verify the untrusted data and the data integrity attestation functions include a data attestation policy.

Example X1 is a machine-readable storage medium including machine-readable instructions to implement a method or realize an apparatus as in any one of the Examples A1-A8, or M1-M7. Example Y1 is an apparatus comprising means for performing of any of the Example methods M1-M7. In Example Y2, the subject matter of Example Y1 can optionally include the means for performing the method comprising a processor and a memory. In Example Y3, the subject matter of Example Y2 can optionally include the memory comprising machine-readable instructions.

What is claimed is:

1. At least one non-transitory computer-readable medium comprising one or more instructions that when executed by at least one processor:
    receive untrusted data for input to an application at an enclave in an electronic device, wherein the enclave includes a protected region of memory in which the application resides for execution;
    receive a flag associated with the application;
    determine whether the flag associated with the application indicates that the application is to be used with integrity verification, wherein the integrity verification module performs data integrity attestation functions to verify the untrusted data for input and wherein the data integrity attestation functions include a data attestation policy specifying constraints on input values for the application;
    responsive to determining the application is to be used with integrity verification:
        isolate the untrusted data for input from at least a portion of the enclave;
        communicate at least a portion of the untrusted data for input to an integrity verification module using an attestation channel;
        receive data integrity verification of the untrusted data for input from the integrity verification module; and
        return the verified untrusted data for input to the application for processing.

2. The at least one computer-readable medium of claim 1, wherein the data integrity attestation functions further include a whitelist.

3. The at least one computer-readable medium of claim 1, wherein the integrity verification module is located in the electronic device.

4. The at least one computer-readable medium of claim 1, wherein the integrity verification module is located in the enclave.

5. The at least one computer-readable medium of claim 1, wherein the integrity verification module is located in a server that is remote from the electronic device.

6. The at least one computer-readable medium of claim 1, wherein the integrity verification module is located in a cloud that is remote from the electronic device.

7. An apparatus comprising:
    an integrity verification module configured to:
        receive untrusted data for input to an application from an enclave in an electronic device, wherein the untrusted data is isolated from at least a portion of the enclave, wherein the enclave includes a protected region of memory in which the application resides for execution, and wherein the untrusted data is communicated using an attestation channel;
        receive a flag associated with the application;
        determine whether the flag associated with the application indicates that the application is to be used with integrity verification, wherein the integrity verification module performs data integrity attestation functions to verify the untrusted data for input and wherein the data integrity attestation functions include a data attestation policy specifying constraints on input values for the application;
        responsive to determining the application is to be used with integrity verification:
            perform data integrity verification of the untrusted data for input; and
            return the results of the data integrity verification to the enclave.

8. The apparatus of claim 7, wherein the data integrity attestation functions further include a whitelist.

9. The apparatus of claim 7, wherein the integrity verification module is located in the electronic device.

10. The apparatus of claim 7, wherein the integrity verification module is located in the enclave.

11. The apparatus of claim 7, wherein the integrity verification module is located in a server that is remote from the electronic device.

12. The apparatus of claim 7, wherein the integrity verification module is located in a cloud that is remote from the electronic device.

13. A method comprising:
    receiving untrusted data for input to an application at an enclave in an electronic device, wherein the enclave includes a protected region of memory in which the application resides for execution;
    receiving a flag associated with the application;
    determining whether the flag associated with the application indicates that the application is to be used with integrity verification, wherein the integrity verification module performs data integrity attestation functions to verify the untrusted data for input and wherein the data integrity attestation functions include a data attestation policy specifying constraints on input values for the application;

responsive to determining the application is to be used with integrity verification:

isolating the untrusted data for input from at least a portion of the enclave;

communicating at least a portion of the untrusted data for input to an integrity verification module using an attestation channel;

receiving data integrity verification of the untrusted data for input from the integrity verification module; and returning the verified untrusted data for input to the application for processing.

14. The method of claim 13, wherein the data integrity attestation functions further include a whitelist.

15. The method of claim 13, wherein the integrity verification module is located in the electronic device.

16. The method of claim 13, wherein the integrity verification module is located in a server that is remote from the electronic device.

17. The method of claim 13, wherein the integrity verification module is located in a cloud that is remote from the electronic device.

18. A system for data verification using enclave attestation, the system comprising:

an integrity verification module configured for:

receiving untrusted data for input to an application at an enclave in an electronic device, wherein the enclave includes a protected region of memory in which the application resides for execution;

receiving a flag associated with the application;

determining whether the flag associated with the application indicates that the application is to be used with integrity verification, wherein the integrity verification module performs data integrity attestation functions to verify the untrusted data for input and wherein the data integrity attestation functions include a data attestation policy specifying constraints on input values for the application;

responsive to determining the application is subject to integrity verification:

isolating the untrusted data for input from at least a portion of the enclave;

communicating at least a portion of the untrusted data for input to an integrity verification module using an attestation channel;

receiving data integrity verification of the untrusted data for input from the integrity verification module; and returning the verified untrusted data for input to the application for processing.

* * * * *